UNITED STATES PATENT OFFICE.

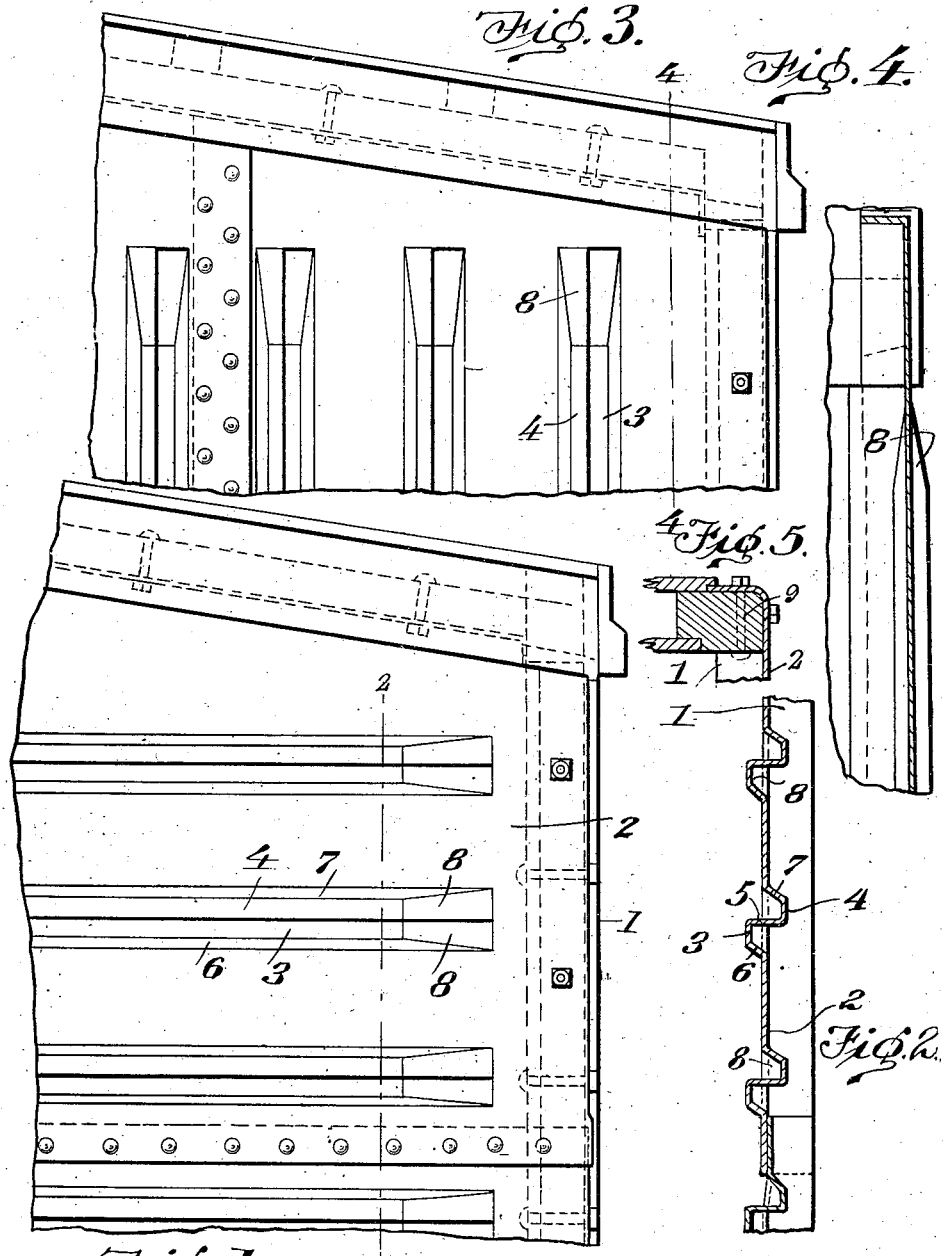

CLANCY MITCHELL ROGERS, OF MOUNT VERNON, ILLINOIS, ASSIGNOR TO MT. VERNON CAR MANUFACTURING COMPANY, OF MOUNT VERNON, ILLINOIS.

CAR END.

1,258,255.   Specification of Letters Patent.   Patented Mar. 5, 1918.

Application filed January 28, 1916. Serial No. 74,839.

*To all whom it may concern:*

Be it known that I, CLANCY M. ROGERS, a citizen of the United States, residing at Mount Vernon, in the county of Jefferson and State of Illinois, have invented certain new and useful Improvements in Car Ends, of which the following is a specification.

This invention relates to car ends, and more particularly to means for reinforcing a car end constructed of sheet metal.

One of the main objects of the invention is to provide a car end of simple construction which may be readily produced by pressing from comparatively heavy sheet metal, this end being provided with a plurality of reinforcing members so shaped as to provide horizontal, vertical, and inclined reinforcing elements which coact to provide a very light and rigid structure well capable of withstanding the stresses to which the car end is subjected. A further object is to provide a car end of the character stated having reinforcing members which are so shaped as to be readily produced by pressing of the material while eliminating, as far as possible, all unnecessary sharp bends such as tend to weaken the structure. Further objects will appear from the detailed description.

In the drawings:—

Figure 1 is a fragmentary end view of a car end constructed in accordance with my invention, Fig. 2 is a section taken substantially on line 2—2 of Fig. 1, Fig. 3 is a similar view of a modified form of car end in which the reinforcing members are disposed oppositely to the construction illustrated in Fig. 1, Fig. 4 is a section taken substantially on line 4—4 of Fig. 3, and Fig. 5 is a detail fragmentary view showing the manner of securing the car end to the corner post of the car.

The body of the car designated generally by 1 may be of any suitable construction. On this body is secured the end 2. This end may be formed in one or more sections of sheet metal, these sections being secured together by riveting or in any other suitable manner. Each section of the end 2 is provided with a plurality of transversely extending reinforcing members formed integral therewith by pressing from the plate. Each of these members is of approximately Z-shape in transverse cross section and is formed from two contiguous oppositely directed ribs 3 and 4, each of these ribs being of substantially U-shape in cross section, the vertical arms of the ribs being connected by the horizontal reinforcing element 5 at their inner ends, and the outer ends of the vertical arms of the ribs 3 and 4 being integrally connected to the body of the plate by the inclined reinforcing elements 6 and 7, respectively. These ribs extend equal distances in opposite directions from the body of the plate so that the vertical arms 3 and 4 are equi-distant from the opposite faces of the plate, as illustrated. In addition, the end of each rib is inclined as at 8 so as to merge into the body of the plate and avoid all sharp bends such as would tend to weaken the plate. It will also be noted that the inclined reinforcing elements 6 and 7 are disposed at an angle to the body of the plate and at an angle to the vertical arms of the ribs, the only sharp bends in the whole structure being at the points of juncture between the horizontal reinforcing element 5 and the inner ends of the vertical arms of the ribs 3 and 4.

The reinforcing members thus produced provide horizontal, vertical, and inclined reinforcing elements formed integral with the plate of the car end, thus producing a comparatively light structure which is well adapted to withstand the stresses to which it is subjected, regardless of the direction of the lines along which the stresses may be transmitted to the car end, due to the fact that the reinforcing elements are disposed so as to act in planes substantially at right angles to the direction of the stresses or strains to which the car end may be subjected. In addition, by eliminating all unnecessary sharp bends, these reinforcing members which provide the reinforcing elements disposed in the manner specified, may be readily formed in the plate by pressing, the whole structure being thus quickly and easily produced at relatively small cost, enabling the use of lighter material than has been heretofore used in structures of this sort.

In Figs. 3 and 4 of the drawings I have shown a car end which is constructed in the same manner as that above described, with the exception that the reinforcing members are disposed vertically of the car end instead of horizontally.

The car end thus formed from sheet metal may be readily secured to the frame work of the car by means of suitable securing bolts or other elements passed through the sheet metal and secured in the frame work. In Fig. 5 I have shown the car end 2 as bent about the corner post 9 of the car and secured thereto by bolts passed through the same. This provides simple and efficient means for securing the car end in position, though it will be obvious that any other suitable means may be used.

What I claim is:—

1. In car ends, a sheet metal plate provided with spaced pairs of reinforcing ribs formed integral with the plate, the ribs of each pair being contiguous and oppositely directed and of approximately U-shape in transverse section, the outer arm of each rib being inclined and the inner edges of the inner arms of the ribs being connected by an integral reinforcing element disposed at right angles thereof.

2. In car ends, a sheet metal plate provided with a plurality of spaced reinforcing members formed integral therewith by pressing of approximately Z-shape in transverse section so disposed relative to the plate as to provide horizontal, vertical, and inclined reinforcing elements for said plate.

3. In car ends, a sheet metal plate provided with a plurality of parallel spaced reinforcing members formed therein by pressing and so shaped as to provide integrally connected horizontal, vertical, and inclined reinforcing elements for said plate.

4. In car ends, a sheet metal plate provided with integral reinforcing members disposed in parallel spaced relation composed of oppositely directed pairs of contiguous ribs of approximately U-shape in transverse section, the outer arm of each rib being inclined and the inner edges of the inner arms of said ribs being connected by an integral reinforcing element disposed at right angles thereto.

5. In car ends, a sheet metal plate provided with a plurality of spaced reinforcing members formed integral therewith, each of said members comprising a central horizontal element projecting beyond the faces of said plate, oppositely directed vertical elements formed integral with said horizontal element, and oppositely inclined elements formed integral with the body of the plate and said vertical elements.

6. In car ends, a sheet metal plate provided with spaced reinforcing members formed integral therewith, each of said members consisting of oppositely directed pairs of contiguous ribs disposed equidistant from the body of the plate and connected thereto at their ends by outwardly inclined elements merging into the body of the plate, each of said ribs having an outer connecting wall inclined to the body of the plate and a vertical wall formed at the inner edge of said inclined wall, and a horizontal reinforcing element connecting the inner ends of said vertical walls.

In testimony whereof I affix my signature in presence of two witnesses.

CLANCY MITCHELL ROGERS.

Witnesses:
 CARL H. HAMMOND,
 JOHN E. LOISEAU.